FOR 100% OIL

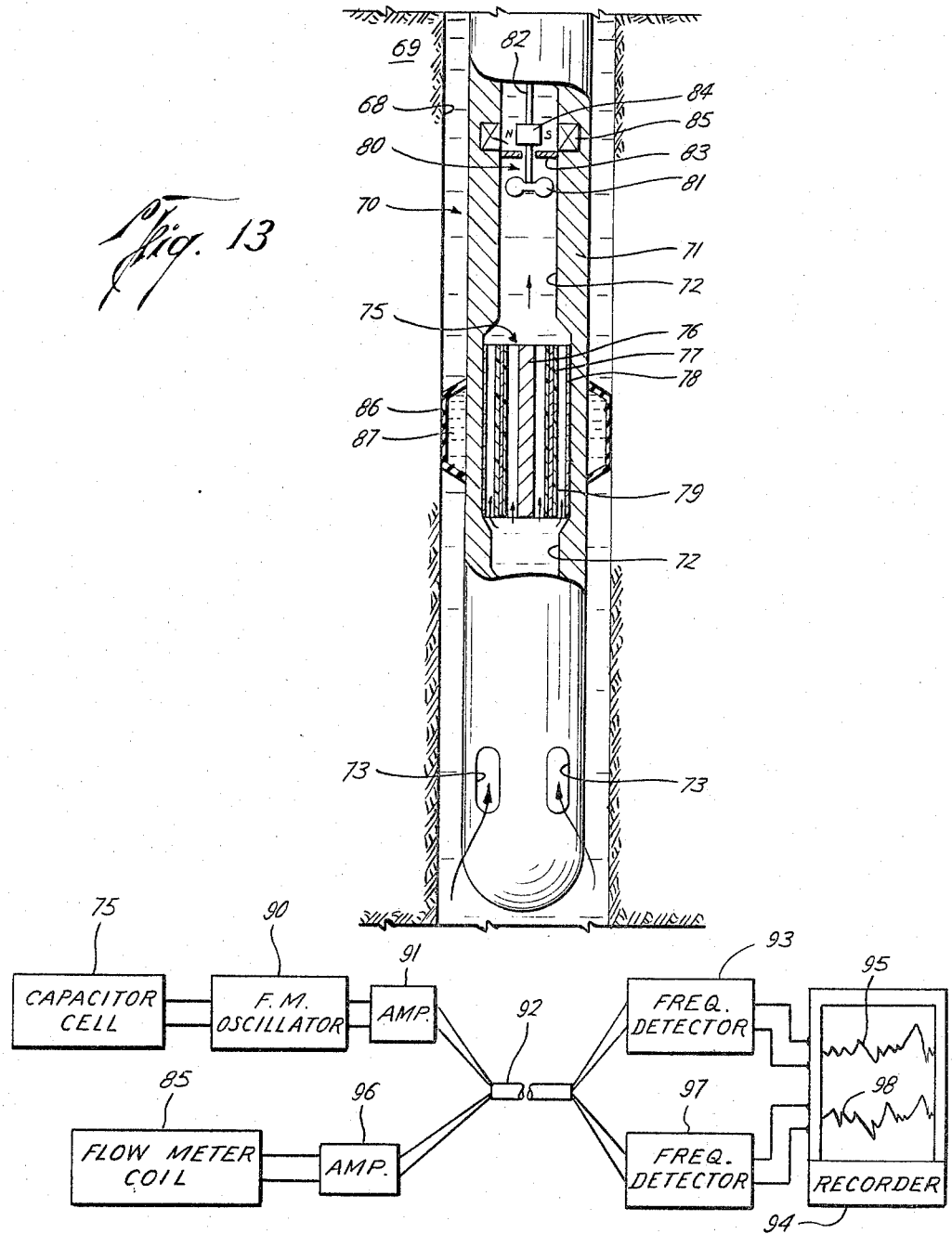

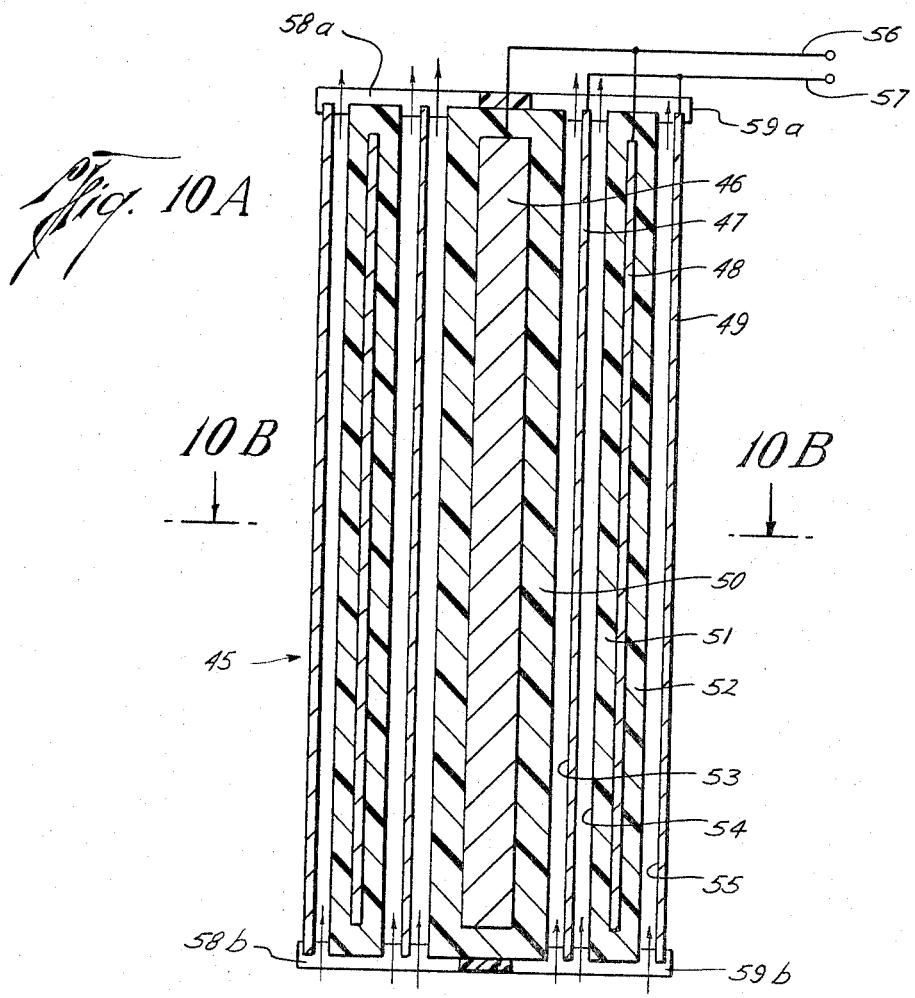
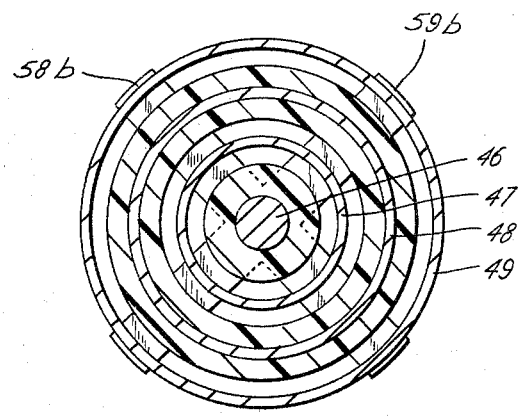

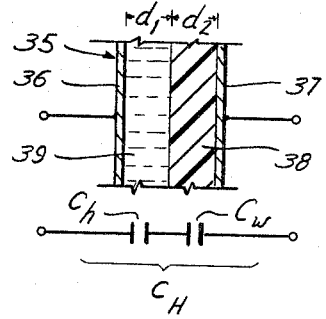

Fig. 5

$$\frac{1}{C_H} = \frac{1}{C_h} + \frac{1}{C_w}$$

$$C_H = \frac{C_h \cdot C_w}{C_h + C_w}$$

FOR 100% WATER (SALTWATER)

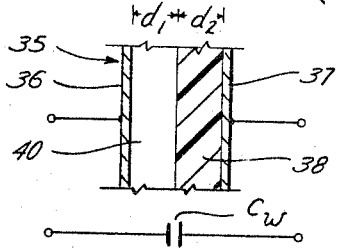

FOR EMULSION OF OIL AND WATER

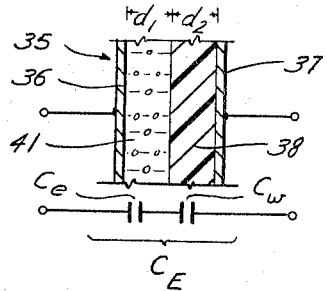

Fig. 7

$$\frac{1}{C_E} = \frac{1}{C_e} + \frac{1}{C_w}$$

$$C_E = C_H \left( \frac{1}{1 - \frac{k}{k_0} \cdot \frac{C_H}{C_h}} \right)$$

FOR MIXTURE OF OIL AND WATER

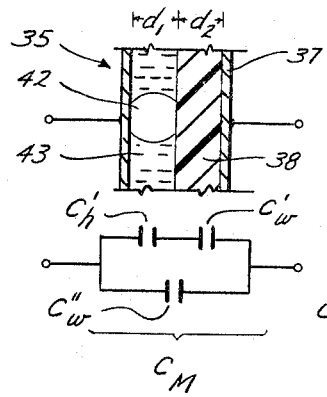

Fig. 8

$$C_M = k \cdot C_w + (1-k) \cdot C_H$$

$$C_M = C_H \left( 1 + k \cdot \frac{C_w}{C_h} \right)$$

Jean Louis Tocanne
INVENTOR.

BY Richard E. Bee

ATTORNEY

Jean Louis Tocanne
INVENTOR.

BY Richard E. Bee
ATTORNEY

Oct. 18, 1966   J. L. TOCANNE   3,279,249
APPARATUS FOR TESTING FLUID MIXTURES
Filed Jan. 28, 1963   5 Sheets-Sheet 5

$$C_e = C_h \left( \frac{1}{1 - \frac{k}{k_0}} \right)$$

Jean Louis Tocanne
INVENTOR.

BY Richard E. Bee
ATTORNEY

United States Patent Office 3,279,249
Patented Oct. 18, 1966

3,279,249
APPARATUS FOR TESTING FLUID MIXTURES
Jean Louis Tocanne, Lozere sur Yvette, France, assignor to Societe de Prospection Electrique Schlumberger, S.A., Paris, France, a corporation of France
Filed Jan. 28, 1963, Ser. No. 254,247
Claims priority, application France, Feb. 7, 1962, 887,313
1 Claim. (Cl. 73—153)

This invention relates to apparatus for testing fluid mixtures and, particularly, to capacitor cells for determining the amount of aqueous fluid in a mixture of aqueous and insulating fluids.

It is frequently desirable to determine the amount of aqueous fluid, such as water, which may be mixed with an insulating fluid, such as oil. In the petroleum industry, for example, it is frequently desirable to determine and regulate the amount of water that is present in oil and other hydrocarbon fluids in various oil refinery and pipe line transmission processes. Also, in the case of the oil wells or boreholes which are the source of crude oils and other hydrocarbons, it is often desirable to determine the water content of the hydrocarbon fluid at different levels in the well. In this way, the subsurface depth level providing the richest mixture of oil can be determined. Also, the level of a water seepage into a producing well can be determined in this manner.

It has been heretofore proposed to use capacitor cells for these purposes. In the previously proposed methods, the fluid mixture to be tested is either placed or caused to flow between the plates or electrodes of the capacitor cell. The electrical capacitance between the electrodes is then measured and used to provide an indication of the water content of the mixture. It has been found, however, that the measured value of the capacitance is dependent on more than just the water content of the mixture. It is also dependent on the way in which the water is dispersed in the oil and, in particular, on whether the mixture is in the form of an emulsion or whether it is in the form of a simple mixture containing relative large water drops or globules. In the case of simple mixtures, the drops of water will periodically establish a short-circuit path between the electrodes of the capacitor cell.

It has been heretofore proposed to overcome this dependence on the nature of the mixture by first emulsifying the mixture to be tested before it is supplied to the capacitor cell. In this way, a uniform mixture is always supplied to the cell and there is no danger of short circuiting the electrodes of the cell. This, however, requires the use of additional apparatus and, sometimes, chemical reagents for producing the emulsion.

It is an object of the invention, therefore, to provide a new and improved and less complicated apparatus for determining the amount of aqueous fluid in a mixture of aqueous and insulating fluids.

It is another object of the invention to provide a new and improved capacitor cell for determining the water content of simple mixtures of oil and water without having to resort to additional apparatus or agents for emulsifying the mixture.

It is a further object of the invention to provide a new and improved capacitor cell for determining the water content of both emulsions and simple mixtures of oil and water and which is not affected by the way in which the water is dispersed in the oil.

It is an additional object of the invention to provide new and improved apparatus for determining the properties of fluids in a borehole drilled into the earth.

In accordance with the invention, there is provided apparatus for determining the amount of aqueous fluid in a mixture of aqueous and insulating fluids. By insulating fluid is meant a fluid having the electrical properties of an electrical insulator. Broadly, the apparatus comprises a pair of electrodes adapted to receive therebetween the fluid mixture to be tested. The apparatus also includes electrical insulation material located on at least one of the electrodes and covering the surface portion thereof which is exposed to the fluid mixture. The thickness of insulation material located between the electrodes is of a magnitude comparable to the thickness of the space between the electrodes remaining to be occupied by the fluid mixture. If the insulation material is in the form of a layer covering only one of the electrodes, then the thickness of the insulation material is the thickness of this layer. If, on the other hand, layers of insulation material are located on each of the electrodes of the pair, then the thickness of insulation material located between the electrodes is the total thickness obtained by adding the thicknesses of the two layers.

For a better understanding of the present invention, together with other and further objects thereof, reference is had to the following description taken in connection with the accompanying drawings, the scope of the invention being pointed out in the appended claim.

Referring to the drawings:

FIGS. 5–8 are schematic representations of portions of a capacitor cell of the present invention for cases where different types of fluids are being tested;

FIG. 10A is a cross-sectional view of one embodiment of a capacitor cell constructed in accordance with the present invention;

FIG. 10B is a cross-sectional view of FIG. 10A;

FIG. 13 illustrates in a partly cross-sectional manner a portion of a fluid testing apparatus suitable for use in a borehole drilled into the earth; and FIG. 14 is a schematic diagram of electrical circuits for use with the testing apparatus of FIG. 13.

Figure 1:
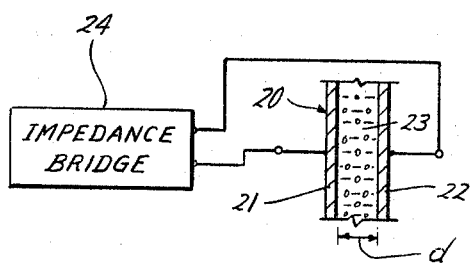
FIG. 1 is a schematic representation of an elementary capacitor cell.

Referring to FIG. 1 of the drawings, there is shown a capacitor cell 20 having a pair of spaced apart electrodes 21 and 22. The inner surfaces of these electrodes define therebetween a test space for receiving a fluid or fluid mixture 23 to be tested. The electrodes 21 and 22 are composed of a conductive metal and are spaced apart by a distance or thickness "$d$." For present purposes, it can be assumed that the electrodes 21 and 22 are in the form of flat rectangular metal plates which are disposed parallel to one another. An impedance bridge 24 is connected across the electrodes 21 and 22 for measuring the electrical capacitance of the cell 20.

In order to determine the behavior of a capacitor cell of this type, various known emulsions of water and oil were introduced between the electrodes of the cell and the corresponding capacitance values were noted. These emulsions were identical except that each contained a different percentage of water. Several series of tests were conducted with waters of different salinities being used for the different series. From these tests, it was determined that the *capacitance of the cell depnded only on the percentage of water and the dielectric constant of the oil*. In particular, it was not dependent on the salinity or salt content of the water.

Figure 2:
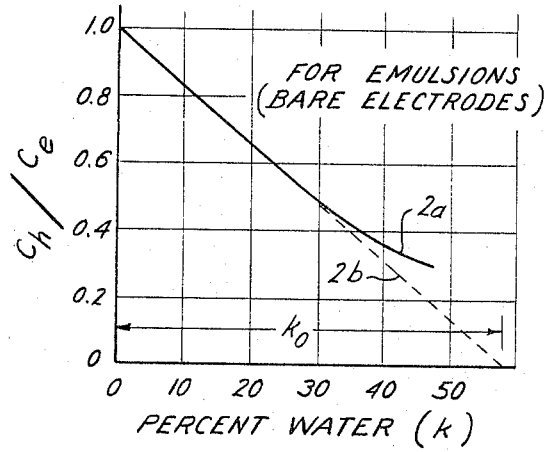
FIG. 2 is a graph describing the behavior of capacitor cells of the type shown in FIG. 1.

The results of these tests are plotted on the graph of FIG. 2. The horizontal axis of the graph is scaled in terms of percent water, while the vertical axis is scaled in terms of the ratio $C_h/C_e$, where $C_h$ is the capacitance of the cell 20 when the fluid between the electrodes is 100% oil and $C_e$ is the capacitance of the cell when the fluid is an emulsion of water and oil. Solid-line curve 2a denotes the experimental results, while dash-line curve 2b represents a straight line approximation of these results.

The equation of the straight line approximation of curve 2b is:

$$C_e = C_h \left( \frac{1}{1 - k/k_o} \right) \quad (1)$$

where "$k$" is the water content expressed as a decimal fraction and "$k_o$" is the intercept of the line 2b with the horizontal axis.

A capacitor cell of the type shown in FIG. 1 is not suitable for use where the fluid mixture introduced between the electrodes is in the nature of a simple mixture containing large sized drops or globules of water. This is because the spacing "$d$" between the electrodes must be relatively small in order to obtain the appropriate sensitivity and, when this is done, the water drops or globules will, from time to time, form a short circuit path between the two electrodes. This is particularly true where, as in most industrial applications, the water will be of a rather salty or conductive character.

Figure 3A:
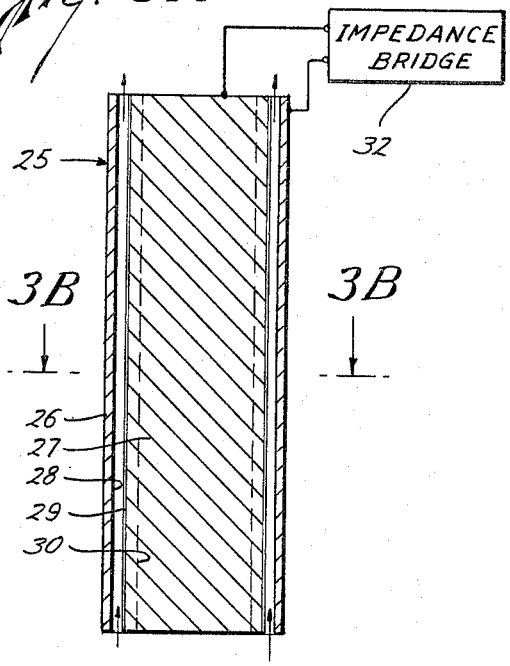
FIG. 3A illustrates in a cross-sectional manner the mechanical details of another type of capacitor cell.
Figure 3B:
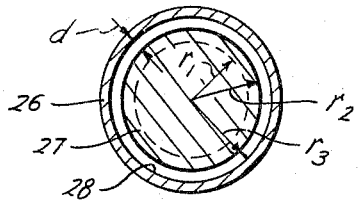
FIG. 3B is a cross-sectional view of FIG. 3A.

In order to overcome this drawback in the case of simple mixtures, a capacitor cell of the type shown in FIGS. 3A and 3B was constructed. As there seen, this capacitor cell 25 includes a pair of concentric cylindrical electrodes 26 and 27. The inside diameter of the outer electrode 26 is larger than the outside diameter of the inner electrode 27 so as to provide an annular fluid flow passageway 28 intermediate the electrodes. In order to prevent shorting out of the electrodes by water drops, the outer surface of the inner electrode 27 is coated with a thin film 29 of a substance which is an electrical insulator.

The inside diameter of the outer electrode 26 was given a dimension of 33 millimeters (1.30 inches). The outside diameter of the inner electrode 27 was given a dimension of 29 millimeters (1.14 inches). The overall length of the electrodes was given a dimension of 100 millimeters (3.94 inches). Thus, the separation distance "$d$" between the neighboring surfaces of the two electrodes 26 and 27 was given a dimension of 2 millimeters (0.08 inch). The cell 25 was found to have an electrical capacitance of approximately 150 micromicrofarads when the test space or fluid passageway 28 between the electrodes was completely filled with a fluid which was 100% oil.

Figure 4:
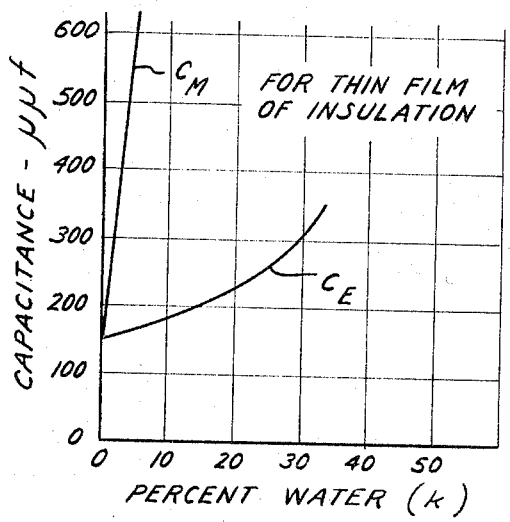
FIG. 4 is a graph describing the behavior of capacitor cells of the type shown in FIGS. 3A and 3B.

The capacitor cell 25 was tested by causing both emulsions and simple mixtures containing known percentages of water to flow through the fluid passageway 28 of the cell and measuring the capacitance for each mixture of each type. The capacitance was measured by means of an impedance bridge 32. The results of these measurements are indicated by the graph of FIG. 4. Curve $C_E$ denotes the results obtained with emulsions containing various percentages of water. Curve $C_M$ denotes the results obtained with simple mixture containing various percentages of water. It is seen from a comparison of these curves that the response or sensitivity of the capacitor cell 25 is quite different for the two different types of mixtures. As indicated in FIG. 4, the capacitor cell 25 has a much greater sensitivity (greater change in capacitance for a given change in water content) for simple mixtures than it has for emulsions. This is undesirable where both types of mixtures may be encountered in the fluids being tested.

It has been discovered that this dependence on the type of mixture can be largely eliminated by covering the active surface portion of at least one of the electrodes with a layer of electrical insulation material of appreciable thickness. Where multiple pairs of electrodes are used, the active surface portion of at least one electrode of each pair should be so covered. In order to understand the reason for the improvement, reference will now be had to the schematic representations of FIGS. 5–8.

Referring first to FIG. 5, there is shown a portion of a capacitor cell 35 having a pair of spaced apart electrodes 36 and 37. The capacitor cell 35 also includes electrical insulation material 38 located on the electrode 37 and covering the surface portion of the electrode 37 which is exposed to the fluid 39 which is to be tested. The thickness of the insulation material 38 is indicated by the dimension "$d_2$," while the thickness of the test space remaining to be occupied by the fluid 39 is indicated by the dimension "$d_1$."

For FIG. 5, the fluid 39 in the test space of the cell is 100% oil. In this case, the total capacitance of the cell is:

$$C_H = \frac{C_h \cdot C_w}{C_h + C_w} \quad (2)$$

where $C_H$ denotes the total capacitance of the cell when the fluid in the cell is 100% oil, $C_h$ denotes the capacitance of the test space or region occupied by the fluid 39 when the fluid is 100% oil, and $C_w$ denotes the capacitance of the region occupied by the insulation material 38.

In FIG. 6 is shown the same capacitor cell 35 for the case where the test space is occupied by a fluid 40 which is 100% water. This water is of a saline character, having a small amount of mineral salts dissolved therein. The resistivity of this water may range anywhere from 0.01 to 10.0 ohm-meters. Consequently, the water 40 is moderately conductive and the only capacitance that need be considered in this case is the capacitance $C_w$ of the insulation material 38.

In FIG. 7 is shown the case where the fluid 41 in the test space of the capacitor cell 35 is an emulsion of oil and water. In this case, the total capacitance of the cell 35 is described by the expression:

$$C_E = C_H \left( \frac{1}{1 - \frac{k}{k_o} \cdot \frac{C_H}{C_h}} \right) \quad (3)$$

where $C_E$ is the total capacitance of the cell when the fluid is an emulsion of oil and water and "$k$" and "$k_o$" are as defined in connection with Equation 1. Equation 3 is obtained by considering the cell to be comprised of two capacitors in series and using the relationship of Equation 1 to describe the capacitance of the region occupied by the emulsion.

Referring to FIG. 8, there is shown the capacitor cell 35 for the case where the test space is filled with a simple non-emulsified mixture of oil and water. The water is represented by a drop of water 42 while the oil is represented by the fluid 43 appearing above and below the water drop 42. In this case, the capacitor cell 35 behaves like a system of capacitors which comprises a capacitor $C_h'$ in series with a second capacitor $C_w'$, with a third capacitor $C_w''$ connected in parallel across the first two capacitors. For this representation, the capacitor $C_h'$ represents the capacitance of the region occupied by the oil 43, the capacitor $C_w'$ represents the capacitance of that part of the region occupied by the insulation material 38 which is in contact with the region occupied by the oil 43, and the capacitor $C_w''$ represents the capacitance of that part of the insulation material region which is in contact with the water drop 42. It can be shown that the total capacitance of a system of this type is described by the expression.

$$C_M = k \cdot C_w + (1-k) \cdot C_H \qquad (4)$$

where $C_M$ is the total capacitance of the cell for the case of a simple mixture and "$k$" is the fractional part of the test space which is occupied by water.

For purposes of comparison with the other equations, Equation 4 can, with the help of the relationship of Equation 2, be rewritten in the form:

$$C_M = C_H \left(1 + k \cdot \frac{C_w}{C_h}\right) \qquad (5)$$

Equation 5 shows that the total capacitance in the case of a simple mixture is linearly proportional to the amount or fraction "$k$" of water in the mixture.

Figure 9:
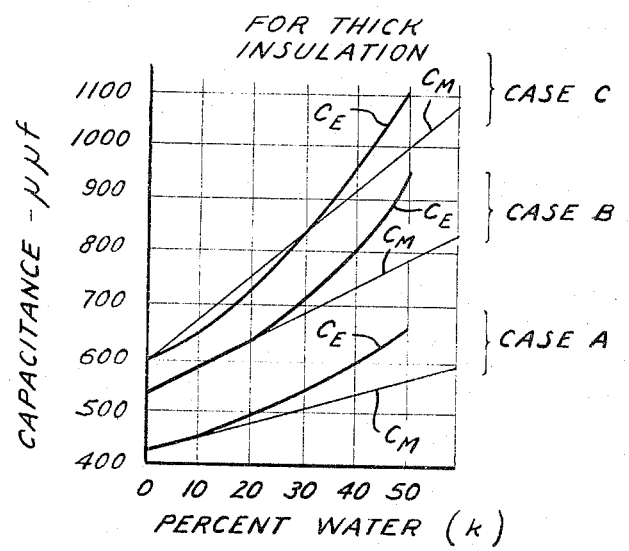
FIG. 9 is a graph used in explaining the behavior of capacitor cells of the type represented in FIGS. 5–8.

Referring now to FIG. 9 of the drawings, there is shown a graph on which are plotted the relationships of Equations 3 and 4 for, in effect, different thicknesses ($d_2$) of the insulation material 38. In each case, the capacitance $C_h$ of the test space region when filled with 100% oil is assumed to be equal to 1000 micromicrofarads. For case A (lower two curves of FIG. 9), the capacitance $C_w$ of the region occupied by the insulation material is assumed to be equal to 730 micromicrofarads. For case B (middle two curves of FIG. 9), the capacitance $C_w$ is assumed to be 1100 micromicrofarads. For case C (upper two curves of FIG. 9), $C_w$ is assumed to be 1450 micromicrofarads.

It is seen from FIG. 9 that case B represents the optimum relationship since there is the greatest degree of coincidence for the $C_M$ and $C_E$ curves in this case. In other words, for case B the response of the capacitor cell to either emulsions or simple mixtures is substantially identical for water percentages ranging from 0 to about 20%. Cases A and C, on the other hand, correspond to the upper and lower limits of the useful range since outside of these limits the lack of agreement between emulsion and simple mixture responses becomes objectionable where the capacitor cell is intended to measure both types of mixtures.

One additional comment may be made regarding case B. In this case, the lack of agreement between the curves for water percentages greater than 20% is, in practice, not too serious. This is because of the fact that when the water content becomes relatively large, the proportion of emulsified water decreases and, consequently, the cell follows more closely the linear curve for simple mixtures. This is particularly true where the fluid mixture is continuously flowing or moving through the cell.

Fortunately, for purposes of construction, the results depicted in FIG. 9 are perfectly general in nature provided that the quantity $C_w/C_H$ is considered for each of the illustrated cases. This ratio of total capacitance for 100% water to total capacitance for 100% oil completely determines the behavior of the capacitor cell to both emulsions and simple mixtures. Also this ratio is a quantity which can be determined by direct measurement simply by placing the appropriate fluid, either water or oil, in the cell. The values of the $C_w/C_H$ ratios for cases A, B, and C are 1.7, 2.1, and 2.5, respectively.

If desired, the $C_w/C_H$ values can be converted to corresponding $C_w/C_h$ values by means of Equation 2. For cases A, B, and C the $C_w/C_h$ values are 0.7, 1.1, and 1.5, respectively.

The capacitance of a simple parallel plate capacitor is described by the expression:

$$C = \frac{EA}{4\pi d} \qquad (6)$$

where E is the dielectric constant of the material between the plates, A is the surface area of one of the plates and "$d$" is the separation distance or spacing between the plates. For the case of a parallel plate capacitor in accordance with the present invention, where two different materials are disposed between the plates, the ratio of the capacitances of the individual regions occupied by the two materials is:

$$\frac{C_w}{C_h} = \frac{E_w}{E_h} \cdot \frac{d_1}{d_2} \qquad (7)$$

where $E_h$ is the dielectric constant of the oil, $d_1$ is the thickness of the test space occupied by the oil, $E_w$ is the dielectric constant of the insulation material 38, and $d_2$ is the thickness of the insulation material 38.

As seen above, the optimum value for the ratio $C_w/C_h$ is a value of 1.1 (case B of FIG. 9). Consequently, if the dielectric constant of the insulation material is substantially equal to the dielectric constant of the oil, which is a desirable condition, then, for a parallel plate capacitor, the thickness $d_2$ of the insulation material should be equal to approximately 90% of the thickness $d_1$ of the test space occupied by the fluid.

For the case of a simple cylindrical capacitor of the type shown in FIGS. 3A and 3B (assuming no insulation material), the capacitance is:

$$C = \frac{EL}{2 \log (r_3/r_2)} \qquad (8)$$

where E is the dielectric constant of the material between the capacitor plates, $r_2$ is the outside radius of the inner cylinder, and $r_3$ is the inside radius of the outer cylinder.

For the present invention, where two different materials are located between the electrode surfaces forming the capacitor:

$$\frac{C_w}{C_h} = \frac{E_w}{E_h} \cdot \frac{\log (r_3/r_2)}{\log (r_2/r_1)} \qquad (9)$$

where $r_1$ is the outside radius of the inner cylindrical electrode, $r_2$ is the outside radius of the insulation material, and $r_3$ is the inside radius of the outer cylindrical electrode (assuming the insulation material to be on the inner electrode).

Using the dimensions given for the cylindrical capacitor of FIGS. 3A and 3B for the radii $r_3$ and $r_2$, assuming that the ratio of $C_w/C_h$ is equal to the optimum value of 1.1, and assuming that the dielectric constant of the oil and the insulation material are substantially equal, then it is found that $r_1$ should have a value of 12.9 millimeters. Thus, if the cylindrical capacitor shown in FIGS. 3A and 3B is modified by replacing the metal material located between the radii $r_1$ and $r_2$ with electrical insulation material having a dielectric constant substantially equal to that of the oil being considered, then the advantages of the present invention will be realized. In this case, the thickness of the insulation material is found to be equal to approximately 80% of the thickness of the test space remaining for the fluid.

The foregoing numerical data, together with corresponding data for cases A and C, are summarized in the following table.

| Quantity | Case A | Case B | Case C |
| --- | --- | --- | --- |
| $C_h$ | 1,000 μμf | 1,000 μμf | 1,000 μμf. |
| $C_w$ | 730 μμf | 1,100 μμf | 1,450 μμf. |
| $C_H$ | 422 μμf | 524 μμf | 592 μμf. |
| $C_w/C_H$ | 1.7 | 2.1 | 2.5. |
| $C_w/C_h$ | 0.7 | 1.1 | 1.5. |
| $d_2/d_1$ (parallel plates) | 1.4 | 0.9 | 0.7. |
| Cylinders: | | | |
| $r_3$ | 16.5 mm | 16.5 mm | 16.5 mm. |
| $r_2$ | 14.5 mm | 14.5 mm | 14.5 mm. |
| $r_1$ | 12.1 mm | 12.9 mm | 13.3 mm. |
| $d_2/d_1$ (cylinders) | 1.2 | 0.8 | 0.6. |

It is seen from the foregoing that in order for a capacitor cell to have the same response for both emulsions and simple mixtures for the critical range of lower water concentration values, then at least one of the electrodes of each pair of electrodes must be covered with insulation material and the thickness of this insulation material must be rather substantial. In particular, the insulation material must have a magnitude comparable to the thickness of the inter-electrode space remaining to be occupied by the fluid mixture. From the foregoing table, it is seen that the thickness of the insulation material should be greater than one-half the thickness of the test space remaining to be occupied by the fluid mixture. When this condition is fulfilled, a capacitor cell of considerably improved performance is obtained.

For cases where insulation material is placed on both electrodes of each pair, then it is the total thickness of insulation material located between the electrodes which must meet the above conditions. Thus, for example, half of the required insulation material could be located on each one of the two electrodes of the pair.

In addition to having a dielectric constant which is on the same order of magnitude as the oil being tested, the electrical insulation material located between the capacitor electrodes should also be of a non-wettable character with respect to water. Otherwise, a film of water may be formed on the surface of the insulation material. This would tend to introduce spurious variations into the measurements. A particularly suitable group of materials which has been found to meet these requirements, and hence is the preferred group for the capacitor insulation material, is a group of synthetic resins know as fluorocarbon resins (Du Pont trademark "Teflon"). A particular fluorocarbon resin which has been found to provide very satisfactory results is polytetrafluoroethylene.

If for some reason it should be necessary to make the insulation material of a material which is wettable by water, then the surface of this material which is exposed to the fluid mixture must be covered or coated with a thin layer or film of non-wettable material.

Referring now to FIGS. 10A and 10B of the drawings, there is shown in detail the manner of construction of one embodiment of a complete capacitor cell in accordance with the present invention. In FIGS. 10A and 10B is shown a capacitor cell 45 which includes four cylindrical electrodes 46, 47, 48, and 49 of different sizes mounted in a concentric manner with respect to one another. The surfaces of electrodes 46 and 48 are covered with layers of electrical insulation material 50, 51 and 52. This insulation material is a non-wettable synthetic resin, preferably, a fluorocarbon resin. A fluid passageway is also provided between each pair of neighboring electrodes, these passageways being designated by the reference numerals 53, 54 and 55.

Each pair of neighboring electrode surfaces defines therebetween an electrical capacitor. In particular, the surface of the inner electrode 46 and the inner surface of the next electrode 47 form a first electrical capacitor. One of the electrodes forming this capacitor, namely, the electrode 46, is covered with a layer of electrical insulation material 50 having a thickness which is comparable to the thickness of the fluid passageway 53 for this capacitor. In a similar manner, the region between electrodes 47 and 48 constitutes a second capacitor, while the region between electrodes 48 and 49 constitutes a third capacitor, each of these capacitors being similar in construction to the first one just considered. The thicknesses of the fluid passageways 53, 54 and 55 are on the order of 2 millimeters (0.08 inch).

Alternate ends of electrodes 46, 47, 48, and 49 are connected together by means of lead wires 56 and 57. In this manner, the three individual capacitors are connected in parallel with one another. Preferably, each of the three capacitors is constructed to have similar capacitance characteristics. Also, each is constructed to satisfy the optimum $C_w/C_H$ relationship. The various cylindrical electrodes are held in place with respect to one another by means of upper cross members 58a and 59a and lower cross members 58b and 59b, the latter being best seen in FIG. 10B. These cross members are made of an electrical insulator material and are provided with suitable notches for engaging the various electrodes and maintaining them in their proper positions.

In operation, the fluid or fluid mixture to be tested is caused to flow through the annular fluid passageways 53, 54 and 55, the fluid in each case entering at one end of the cell 45 and leaving at the other end thereof. The total capacitance of the cell is then measured by means of an impedance bridge or some other form of capacitance-determining apparatus which is connected to the lead wires 56 and 57. The capacitor cell is initially calibrated by measuring the capacitance when known mixtures of fluids are flowing therethrough.

Figure 11:
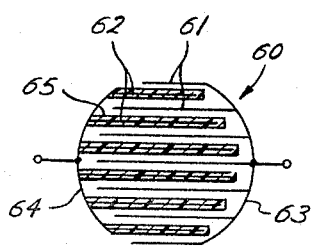
FIG. 11 is a schematic representation of another embodiment of capacitor cell of the present invention.

Referring now to FIG. 11 of the drawings, there is shown a modified form of construction for a multi-electrode type of capacitor cell. The capacitor cell 60 shown in FIG. 11 includes two interleaved sets of parallel plate electrodes 61 and 62. Electrodes 61 are connected together by a common conductor 63, while electrodes 62 are connected together by a common conductor 64. Each side of each of the electrodes 62 is covered with a layer of electrical insulation material 65 having a thickness comparable to the thickness of the space remaining between any neighboring pair of electrodes for the passage of the fluid to be tested.

Figure 12:
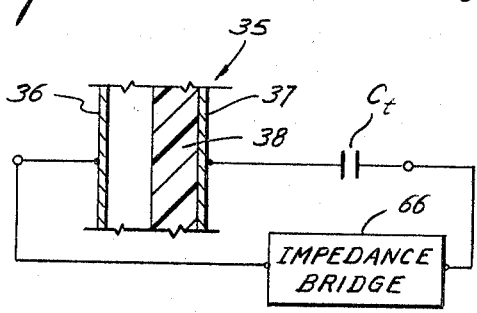
FIG. 12 is a schematic representation of a capacitor cell and one form of accompanying electrical circuit.

In FIG. 12 is shown a modified form of electrical circuit for use with a capacitor cell of the present invention, the elemental cell 35 being shown as an example. In this circuit, an additional external capacitor $C_t$ is connected in series with the capacitor cell 35. This capacitor $C_t$ is used as a trimmer capacitor to adjust the total capacitances seen by the measuring device, in this case an impedance bridge 66, to compensate for minor departures of the cell capacitances from their optimum values.

Referring now to FIG. 13 of the drawings, there is shown a portion of a borehole apparatus for determining the properties of fluids in a borehole 68 drilled into the earth 69. In particular, FIG. 13 shows a borehole testing apparatus 70 which comprises a housing 71 having a longitudinal fluid passageway 72 therein. The extremities of the housing 71 are constructed so that the extremities of passageway 72 communicate with the external borehole environment. At the lower end of the housing 71, this is done by providing ports 73 which run in between the lower end of passageway 72 and the outer surface of the housing 71. A similar construction is provided towards the upper end of the housing 71, this construction not being shown in the drawing.

The apparatus 70 also includes a capacitor cell 75 supported in the fluid passageway 72 for providing indications of the water content of the fluids flowing through the passageway 72. This capacitor cell 75 is similar to that shown in FIGS. 10A and 10B except that only three electrodes, namely, electrodes 76, 77, 78, are used. In this case, it is sufficient to place electrical insulation material 79 on both sides of the middle electrode 77, the other electrodes remaining uncovered. As before, the thickness of the insulation material is comparable in magnitude to the thickness of the fluid passageway for each of the individual capacitors of the cell.

The apparatus 70 also includes flow meter means 80 supported along the fluid passageway 72 for providing indications of the flow rate of fluids flowing through this passageway. The flow meter 80 includes a propeller blade 81 mounted on a rotatable shaft 82. Shaft 82 is supported by suitable bearing means such as those indicated by bearing means 83. Attached to the rotatable shaft 82 is a permanent magnet 84 which cooperates with a detector coil 85 secured to the housing 71 for developing a periodic signal having a frequency which is proportional to the rate of rotation of the propeller blade 81.

The apparatus 70 is further provided with inflatable rubber packer means 86 which is secured to the exterior of the housing 71 intermediate the extremities of the fluid passageway 72. The packer means 86 is adapted to be inflated by pumping into the interior thereof a suitable hydraulic fluid 87. Suitable hydraulic systems for accomplishing this purpose are known in the borehole testing art and, hence, are not shown in the drawings. When inflated, the packer means 86, which completely encircles the housing 71, serves to prevent fluid flow between the exterior of the housing 71 and the wall of the borehole 68.

Referring now to FIG. 14 of the drawings, there is shown a schematic diagram of electrical circuits for use with the testing apparatus of FIG. 13. As indicated in FIG. 14, the capacitor cell 75 is connected to an F.M. oscillator 90. In particular, the *capacitor cell 75 is connected into the frequency-determining circuit of the oscillator 90.* As a consequence, the frequency of oscillation of the oscillator 90 is varied as the capacitance of the capacitor cell 75 varies. The output signal from oscillator 90 is amplified by an amplifier 91 and then transmitted to the surface of the earth by way of a pair of insulated conductors contained in an armored multi-conductor cable 92 which is used for lowering the apparatus 70 into the borehole.

At the surface, the frequency-modulated signal from oscillator 90 is detected by a frequency detector 93 to provide at the output of detector 93 a variable direct-current type of signal the amplitude of which is proportional to the capacitance of the capacitor cell 75. The output signal from the detector 93 is supplied to a recorder 94 for producing thereon a recorder trace 95 which represents the variations in the capacitance of the capacitor cell 75.

The signal developed by the flow meter coil 85 is also supplied to the surface of the earth, this being done by way of an amplifier 96 and a second pair of insulated conductors in the cable 92. At the surface, the flow meter signal, which is a signal which varies in frequency in accordance with the flow rate, is detected by a second frequency detector 97 to provide at the output of detector 97 a direct-current type of signal the amplitude of which is proportional to the flow rate. The output signal from detector 97 is supplied to the recorder 94 to produce thereon a second recorder trace 98 which represents the variations in the flow rate of the fluid passing through the interior of the testing apparatus 70.

Considering the operation of the testing apparatus described in FIGS. 13 and 14, the apparatus 70 is lowered into the borehole 68 by means of the armored cable until the first depth level of interest is reached. The apparatus 70 is then held stationary at this depth level and the packer member 86 is inflated. This forces the borehole fluids to flow through the interior of the apparatus 70 by way of the fluid passageway 72. The water fraction indications provided by the capacitor cell 75 and the flow rate indications provided by the flow meter 80 are then observed and recorded by the recorder 94 for a short interval of time. After this, the packer means 86 is deflated and the apparatus 70 is moved to the next depth of interest in the borehole 68. The inflating and measuring process is then repeated at this depth level. This process may be repeated for as many depth levels as is desired.

Since there is provided on the recorder 94 records of both the water fraction and of the flow rate it is possible to determine the total amount of water which is flowing in the borehole at any given level therein. This enables a determination of the absolute amounts of water and oil that will be supplied by the different earth strata during any predetermined length of time.

Depending on the particular construction of the capacitor cell and the bandwidth of the various circuits which handle the capacitor cell signal, it may be that for some combinations of flow rates and water percentages that fluctuations may appear in the capacitor cell signal corresponding to the passage of individual water drops through the cell. In this case, the average value of the signal recorded for any given depth level, and not the individual fluctuations in this signal, is the parameter that is of interest.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

In apparatus for determining the properties of fluids in a borehole drilled into the earth, the combination comprising:

an elongated housing adapted to be lowered into the borehole and having a longitudinal fluid passageway therein, the extremities of which communicate with the external borehole environment;

at least three elongated concentric cylindrical electrodes mounted in the fluid passageway coaxially with the longitudinal axis thereof and intermediate the extremities of such passageway, neighboring surfaces of adjacent electrodes being of different diameters to provide fluid passageways between adjacent electrodes;

electrical insulation material covering at least one of each pair of neighboring surfaces of adjacent electrodes, the thickness of insulation material located between each pair of electrode surfaces being of a magnitude comparable to the thickness of the space remaining between the pair of electrode surfaces for the passage of fluid;

first measuring circuit means electrically interconnecting every other one of the electrodes to form a first electrode group;

second measuring circuit means electrically interconnecting intermediate ones of the electrodes to form a second electrode group;

electrical circuit means coupled to the first and second measuring circuit means for providing a signal indicative of the electrical capacitance between the two electrode groups;

flowmeter means mounted in the fluid passageway adjacent to the electrodes for measuring the velocity of the fluid flowing between the electrodes and generating a signal indicative of such fluid velocity;

means for holding the housing stationary at a selected depth level in the borehole;

and a signal recorder operative while the housing is held stationary and coupled to the electrical circuit means and to the flowmeter means and responsive to both the capacitance signal and the fluid velocity signal for recording these two signals as side-by-side traces on a common recording medium for a predetermined interval of time for providing correlated indications from which the amount of aqueous fluid in the borehole fluid at the selected depth level may be more accurately determined.

References Cited by the Examiner

UNITED STATES PATENTS

| | | | |
|---|---|---|---|
| 2,599,583 | 6/1952 | Robinson et al. | 324—2 |
| 2,752,562 | 6/1956 | De Witte | 324—2 |
| 2,785,374 | 3/1957 | Fay et al. | 324—1 |
| 2,786,351 | 3/1957 | Wiley et al. | 73—155 |
| 2,951,198 | 8/1960 | Blanchard | 324—2 |
| 3,133,437 | 5/1964 | Remke et al. | 73—53 |

RICHARD C. QUEISSER, *Primary Examiner.*

JOSEPH P. STRIZAK, *Examiner.*

LAWRENCE R. FRANKLIN, JAMES J. GILL,
*Assistant Examiners.*